Aug. 12, 1952 — C. V. PEVEY ET AL — 2,606,615
HOLLOW DRILL
Filed Oct. 24, 1947
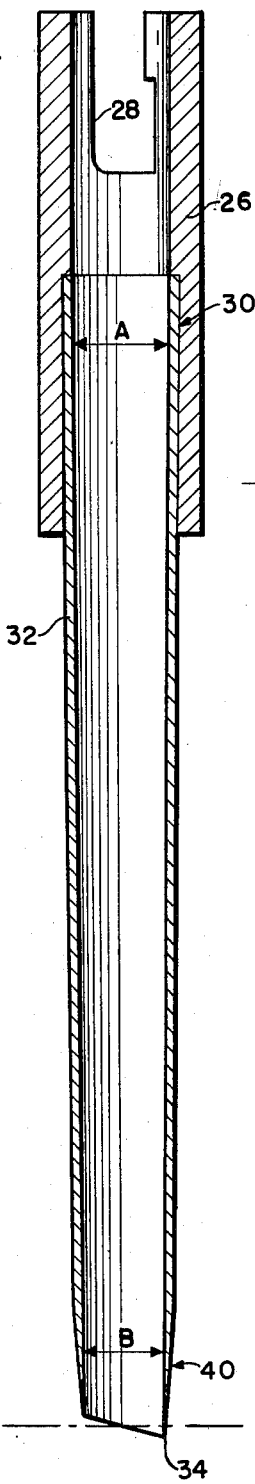
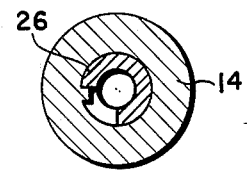
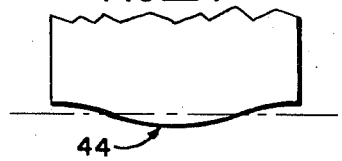
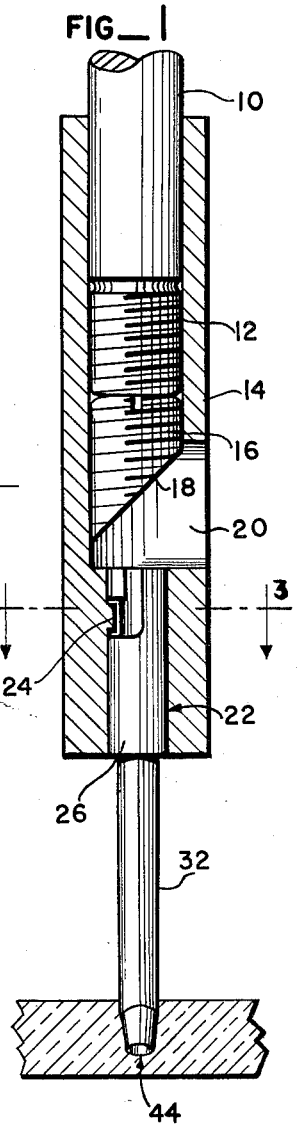
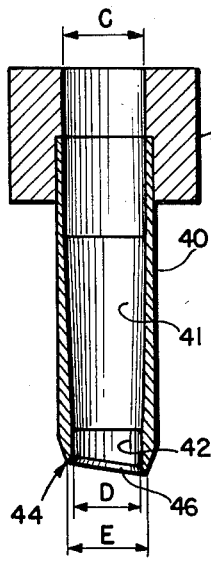
CLAUD V. PEVEY &
MARION F. SMITH
INVENTORS
BY *Smith & Tuck*
ATTORNEYS Patented Aug. 12, 1952

2,606,615

UNITED STATES PATENT OFFICE 2,606,615

HOLLOW DRILL

Claude V. Pevey and Marion F. Smith, Shelton, Wash., assignors to Simpson Logging Company, Shelton, Wash.

Application October 24, 1947, Serial No. 781,918

1 Claim. (Cl. 164—86)

This invention relates to a hollow drill and, more particularly, to a drill for perforating fiber boards in the production of acoustic tile, and the like.

Fiber boards are usually formed of fibers derived from woody sources that are matted into sheet form while wet, and then dried and sized into a fairly loose mass varying in thickness from one-half inch upward and having a specific gravity of approximately 0.15 to 0.30. Such fiber boards provide desirable acoustic properties, particularly when they are fissured or perforated through the exposed face with many openings, to receive and trap sound waves.

Various types of cutters have been employed to perform the perforating operation. These include cutters that are pressed, without rotation, into the fiber board, but these crush, tear, and fail to cut a cleanly formed hole. Since these resilient, flexible fibers have been pressed from the center of the hole and compacted at the sides of the hole in the punching operation without actually removing a core, they tend to spring back and regain their original position after an extended period of time. As a result, the holes pucker together and finally close up.

Rotary twist drills as used for wood or metal drilling are also used for acoustic tile. However, they depend upon the material being drilled to be stiff and rigid enough to hold the fiber or particles in place for cutting with a knife edge. These drills when used on soft, absorbent acoustic tile, cut a hole in which many of the fibers are pressed aside and after removal of the drill, spring back to give a fringed or fussy hole. Paint spraying or brushing the tile coats some of these fibers and tends to bridge the hole and reduce the sound-trapping function to a marked degree.

Some tile is fissured with saw cuts across the surface. These saw cuts may be 3½" long, on ¾" centers, and arranged in three rows as practiced in the United States, or of shorter length and in four rows as practiced in Sweden. Also, they may extend 11" and cut the tile into a multitude of 1" squares penetrating to within ⅛" of the back of the tile. Such fissuring gives a distinct pattern to the tile and is objectionable to many architects and users on this account.

Rotary hollow cutters have been used, but too often it has been necessary to include screw means inside the cutter to carry off the cuttings, as otherwise the cuttings will pile up and jam tightly, creating back pressure, which produces carbonized cuttings that effectively block the opening through the cutter. The usual operation includes using a rotary cutting edge that is parallel with the face being perforated, but such has been found to produce fuzzy edges around the holes, especially after the cutter has been used a short time and has tended to become dull.

It is therefore an object of this invention to provide an efficient cutter for perforating fiber boards that will form a symmetrical opening having cleanly cut edges.

Another object is the provision of a cutter as described that is free from jamming during long and repeated use at high speed.

A further object of the invention resides in providing a hollow rotary cutter for fiber boards that has an improved cutting action and a cutting edge that does not readily dull under hard use.

Still another object is to provide a cutter that may be used to partially perforate fiber board and will leave a cleanly bottomed opening when the cutter is withdrawn.

The foregoing objects and others ancillary thereto, we prefer to accomplish as follows:

According to a preferred embodiment of this invention, there is provided a hollow tubular steel or steel alloy shank that has a chucking element on one end for mounting on a rotary spindle and a cutting edge on the other end for severing fibers as it is urged into a sheet of fiber board. The cutter is substantially cylindrical externally and is conically tapered adjacent the cutting edge in the form of a frustum. Internally, the tube has an increasing diameter progressively from the cutting edge toward the spindle end. The cutting edge is characterized by being "breadknife-like" in that it is scalloped in projection and, when viewed from one side, lies in a plane non-perpendicular to the axis of rotation of the shank. During rotation, this edge is presented many times to the board and applies pressure at one point, along with a sliding action of a very sharp edge. This prevents crushing of the soft board and gives a very clean cut of the fibers. Under certain circumstances, a slightly contracting taper is applied to the interior of the shank closely adjacent the cutting edge to facilitate operation during cutting.

The novel features that we consider characteristic of this invention are set forth with particularity in the append claim. The invention itself, however, both as to its organization and its method of operation, together with additional objects and advantages thereof, will best be understood from the following description of a specific embodiment when read in connection with the accompanying drawings, in which:

Fig. 1 is a view in elevation of the hollow drill as it appears mounted in a rotary spindle, the latter being shown in section for convenience of illustration;

Fig. 2 is an enlarged view in section along the axis of the hollow drill;

Fig. 3 is a view in cross section taken on line 3—3 of Fig. 1;

Fig. 4 is a schematic view showing in projection the shape of the cutting edge; and Fig. 5 shows in accentuated form a modified type of the hollow drill.

A hollow perforating drill, to meet the requirements of the work considered herein, must have at least two distinct characteristics; it must be capable of cutting, repeatedly and accurately, clean and symmetrical holes in fiber board; and it must be capable of being quickly and accurately sharpened to the desired contour without requiring undue skill or elaborate equipment. The preferred embodiment of this invention accomplishes these ends in a practical and useful manner.

Referring to Fig. 1, there is shown a rotary spindle 10, having a threaded end 12, that receives the sleeve 14, which is locked to the spindle by means of jam screw 16. The lower face 18 of screw 16 is beveled and arranged in the sleeve so that the face 18 is angularly disposed to side opening 20, through which cuttings may be discharged, and also angularly disposed to the axis of the sleeve. In a lower axial opening 22 of sleeve 14 is mounted the collar 26 of the hollow drill shown in Figures 2 and 5. A bayonet slot 28 in the collar co-acts with lug 24 of the sleeve to retain the collar in the sleeve. The collar is removed by turning the same slightly to disengage the lug 24 from the overhanging portion of the bayonet slot 28, whereupon the collar may be withdrawn.

As shown in Fig. 2, the collar 26 is counterbored at 30 to receive the end of drill tube 32 in a smooth and flush manner that precludes having shoulders that would catch or obstruct the cuttings as they move therethrough. In this tool, the tube has been swaged slightly to swell it into intimate contact with the counterbored wall of the collar 26. The reference character A indicates an interior diameter that is slightly greater than the tube diameter B adjacent the cutting edge 34. Satisfactory results have been obtained in a drill tube having an outside diameter of 0.1875 inch by providing an inner diameter of 0.152 inch at A and another inner diameter of 0.142 inch at B. In this way, relief is provided for the cuttings as they move progressively from the cutting edge, under the urgence of the following pieces, toward the deflecting face 18, from whence they are discharged laterally through opening 20.

An important feature of the tool is the shape of the cutting edge. In order to prevent bunching of the cuttings inside of the tool and in order to facilitate sharpening operations, the outer face of the tool is ground to a conical shape, as at 40. The axis of the cone is misaligned with the axis of the shank slightly in a non-parallel manner. In other words, these two axes intersect. In this way there is formed a cutting edge that is in projection, somewhat as shown in Fig. 4, being sinuous or wavy. It can be likened to a "breadknife" edge and it functions during rotation in a similar manner, cutting with a slight sawing action, rather than tearing its way through the fiber. It will be noted that the cutting edge lies in a plane which is not perpendicular to the axis of the tool.

One manner of obtaining the particular cutting edge described is to present the tool to a rotary grinding wheel by means of a grinding chuck that is turned to revolve the shank with a slight wobble, or non-axially. Such wobble need only be a few thousandths of an inch to produce a desirable cant to the cutting edge with respect to the shank axis.

Another form of the tool is shown in Fig. 5, in which the interiorly tapered wall 41 of shank 40 contracts from the dimension C to dimension D a few thousandths of an inch. There is a cylindrical inner wall 42 between the tapering wall and the cutting edge 44, which is canted as previously described with respect to the shank axis. To further facilitate use of the tool, a slight taper is supplied at 46, as suggested in the difference in diameters D and E. This taper is accomplished by applying, after exterior grinding of the tool face, a small conical stone which removes the wire edge or burr that might be present and further cuts into the shank a slight degree.

As an example, in a shank of 0.1875 inch of this form of the invention, it has been found that a dimension of 0.164 inch for C, contracting to 0.142 inch for D and flaring to 0.146 inch for E, is quite satisfactory. Such an arrangement provides a "pinching-off" action for the cuttings, the restriction tending to grab the core, turn it with the drill and twist it off at the bottom, and insures that the perforation is cleanly bottomed in those cases where the fiber board is only partially pierced.

The mechanics of the manufacture of drills are many and varied. Thus, a drill may be bored and turned down from a solid rod; it may be made from two pieces of tubing as shown in the drawing, obtaining the internal taper by the use of a taper reamer; it may be made from two pieces of tubing heated and forced onto a tapered mandrel to obtain the internal taper; or the drill may be made from a larger diameter tube, say $\frac{3}{16}$" I. D. swaged down at the drilling end to $\frac{3}{16}$" O. D.; or it could be made from a thin walled $\frac{3}{16}$" O. D. tube with an internal upset extending about ½" up the tube on the cutting end.

As the cutter enters the fiber board, it removes a portion therefrom by cutting during rotation. The removed portion or cutting is urged into the hollow interior of the tool by successive cuttings. As the cuttings fill the tube they overflow sidewise, being deflected against face 18 and out of the opening 20. Any tendency to bind within the tube is precluded by the flare between points A and B.

After each piercing, when the tool is withdrawn from the fiber board, the walls tend to spring back to normal, in overcoming the taper imparted by the conical surface, back from the cutting edge.

While we have shown and described particular embodiments of our invention, it will occur to those skilled in the art that various changes and modifications may be made without departing from the invention, and we, therefore, aim in the appended claim to cover all such changes and modifications as fall within the true spirit and scope of the invention.

Having thus described our invention, we claim:

A rotary drill for perforating, perpendicular to one face, fiber boards formed of loosely re-integrated fiber materials, comprising: a tubular shank of metal to be rotated, the inner and outer walls of said shank being concentric with the axis of rotation, said shank being conically tapered forming a conical outer wall at one end and exteriorly of said inner wall with the axis of taper being non-parallel with the axis of rotation, whereby there is a knife-like cutting edge formed at the juncture of the inner wall and said conical wall and lying in a plane non-perpendicular with the axis of rotation, said tube having a short cylindrical surface interiorly contiguous with said cutting edge, there being a very short portion of said interior wall at the juncture of said cylindrical surface and said cutting edge which is slightly tapered from a smaller diameter inward to a larger diameter outward, said inner wall progressively flaring from said cylindrical surface inward, means for holding said shank and presenting said shank to boards to be perforated with the axis of rotation of said shank perpendicular to the face of such boards, and means for rotating said shank.

CLAUDE V. PEVEY.
MARION F. SMITH.

REFERENCES CITED

The following references are of record in the file of this patent:

UNITED STATES PATENTS

| Number | Name | Date |
|---|---|---|
| 676,782 | Stimpson | June 18, 1901 |
| 762,507 | Watt | June 14, 1904 |
| 808,408 | Sparks | Dec. 26, 1905 |
| 1,016,752 | Leith | Feb. 6, 1912 |
| 1,279,945 | Dom | Sept. 24, 1918 |
| 1,557,464 | Mick | Oct. 13, 1925 |
| 1,654,671 | Vollrath | Jan. 3, 1928 |
| 2,031,977 | Olsen | Feb. 25, 1936 |
| 2,187,651 | Jackson | Jan. 16, 1940 |

FOREIGN PATENTS

| Number | Country | Date |
|---|---|---|
| 777,245 | France | Nov. 26, 1934 |